United States Patent
Drewes et al.

(10) Patent No.: US 9,759,623 B2
(45) Date of Patent: Sep. 12, 2017

(54) PRESSURE MEASURING CELL

(71) Applicant: ENDRESS+HAUSER GMBH+CO. KG, Maulburg (DE)

(72) Inventors: Ulfert Drewes, Mullheim (DE); Nils Ponath, Lorrach (DE); Andreas Rossberg, Bad Sackingen (DE); Elke Schmidt, Bad Sackingen (DE)

( * ) Notice: Subject to any disclaimer, the term of this patent is extended or adjusted under 35 U.S.C. 154(b) by 106 days.

(21) Appl. No.: 14/647,527

(22) PCT Filed: Oct. 29, 2013

(86) PCT No.: PCT/EP2013/072573
§ 371 (c)(1),
(2) Date: May 27, 2015

(87) PCT Pub. No.: WO2014/082807
PCT Pub. Date: Jun. 5, 2014

(65) Prior Publication Data
US 2015/0300903 A1    Oct. 22, 2015

(30) Foreign Application Priority Data

Nov. 28, 2012  (DE) .................. 10 2012 111 533

(51) Int. Cl.
*G01L 19/06* (2006.01)
*G01L 9/00* (2006.01)
(52) U.S. Cl.
CPC ............ *G01L 19/06* (2013.01); *G01L 9/0044* (2013.01); *G01L 19/0618* (2013.01)
(58) Field of Classification Search
CPC ..... G01L 19/06; G01L 19/00; G01L 19/0618; G01L 9/00; G01L 9/0044
See application file for complete search history.

(56) References Cited

U.S. PATENT DOCUMENTS 2,697,352 A * 12/1954 Umphrey ............ G01L 19/0618
73/723
2,811,984 A * 11/1957 Chertock .............. G01L 9/0044
92/102
(Continued)

FOREIGN PATENT DOCUMENTS

CN    1079821 A    12/1993
CN    1469995 A    1/2004
(Continued)

OTHER PUBLICATIONS

German Search Report, German PTO, Munich, Dec. 17, 2012.
(Continued)

*Primary Examiner* — Nguyen Ha
(74) *Attorney, Agent, or Firm* — Bacon & Thomas, PLLC

(57) ABSTRACT

A pressure measuring cell includes an elastic measuring membrane which is contactable with a first pressure on a first side and with a second pressure on a second side facing away from the first side. The measuring membrane is deflectable as a function of a difference between the first pressure and the second pressure, wherein the measuring membrane pressure-tightly isolates a first volume, which is facing the first side of the measuring membrane, from a second volume, which is facing the second side of the measuring membrane. The pressure measuring cell further includes a transducer for transducing the pressure dependent deflection of the measuring membrane into an electrical or optical signal. The measuring membrane has in the equilibrium state of the measuring membrane compressive stresses at least at the surface of the measuring membrane at least in a radial edge region, in which in the deflected state of the measuring membrane under pressure loading tensile stress maxima occur.

2 Claims, 3 Drawing Sheets

(56) References Cited

U.S. PATENT DOCUMENTS

| | | | |
|---|---|---|---|
| 4,158,311 | A | 6/1979 | Yasuhara |
| 5,531,128 | A | 7/1996 | Ryhanen |
| 7,137,304 | B2 | 11/2006 | Martin |
| 7,360,428 | B2 | 4/2008 | Banholzer et al. |
| 8,294,237 | B2 | 10/2012 | Eriksen |
| 8,402,836 | B2 | 3/2013 | Dannhauer et al. |
| 2010/0044810 | A1 | 2/2010 | Eriksen |
| 2012/0227505 | A1 | 9/2012 | Belleville |

FOREIGN PATENT DOCUMENTS

| | | | | |
|---|---|---|---|---|
| CN | 1596367 | A | 3/2005 | |
| CN | 1672023 | A | 9/2005 | |
| CN | 101896802 | A | 11/2010 | |
| DE | 2825437 | A1 | 12/1978 | |
| DE | 69414783 | T2 | 7/1999 | |
| DE | 102006023724 | A1 | 1/2008 | |
| DE | 102006032128 | A1 | 1/2008 | |
| EP | 0571106 | A1 | 11/1993 | |
| EP | 1876434 | A3 | 1/2008 | |
| JP | 05005664 | A * | 1/1993 | ............ G01L 9/04 |
| WO | 2004013593 | A1 | 2/2004 | |
| WO | 2008037334 | A1 | 4/2008 | |

OTHER PUBLICATIONS

International Search Report, EPO, The Netherlands, May 19, 2014.
English Translation of the International Preliminary Report on Patentability, WIPO, Geneva, CH, Jun. 11, 2015.

* cited by examiner

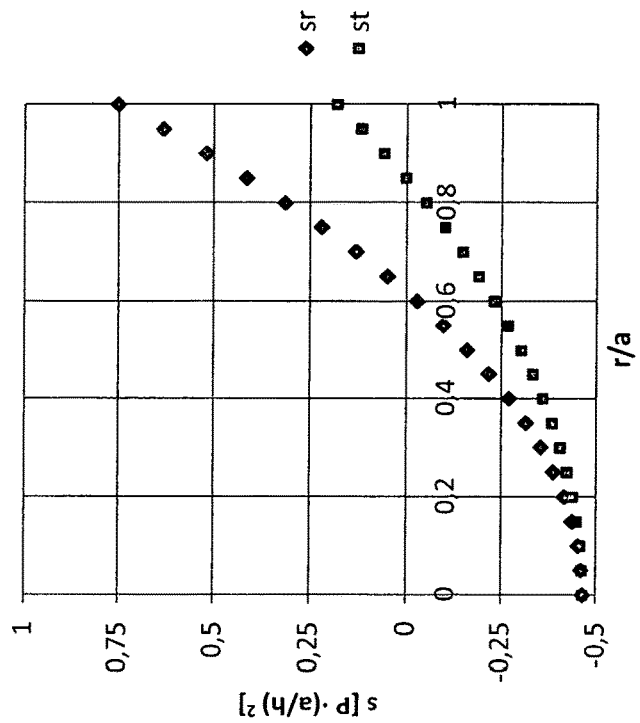
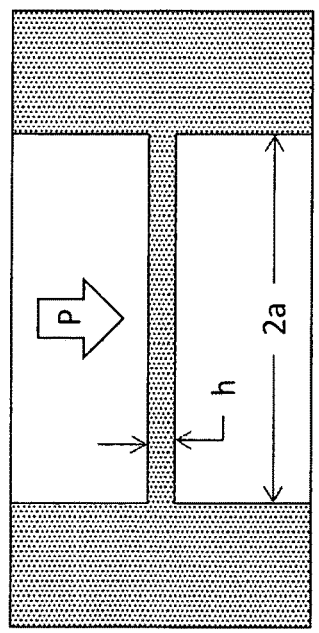
Fig. 1a
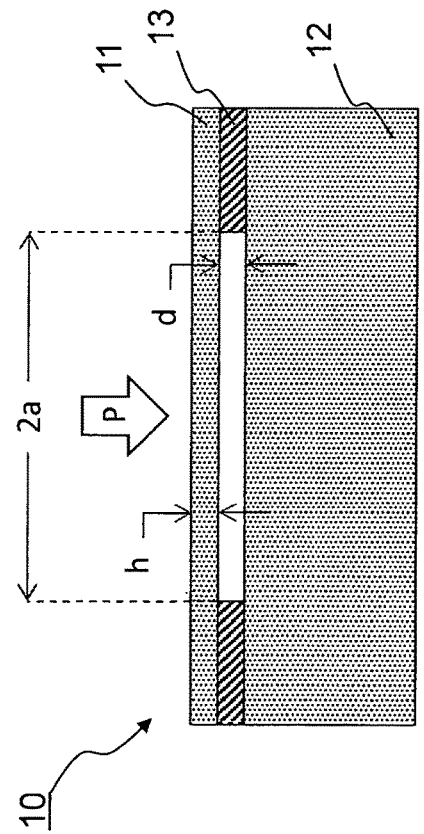
Fig. 1b (Prior Art)
Fig. 1c

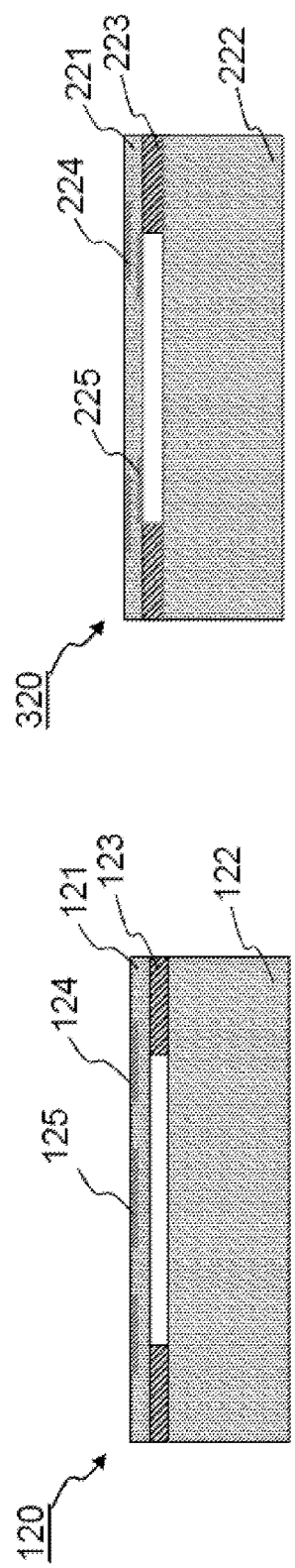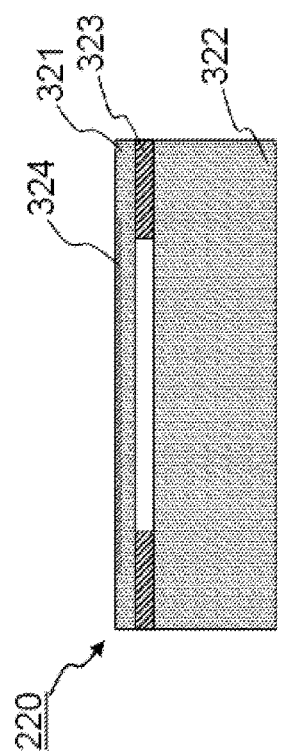

PRESSURE MEASURING CELL

TECHNICAL FIELD

The present invention relates to a pressure measuring cell, which has an elastic measuring membrane, wherein the measuring membrane is contactable with a first pressure on a first side and with a second pressure on a second side facing away from the first side. The measuring membrane is deflectable as a function of a difference between the first pressure and the second pressure, wherein the measuring membrane pressure-tightly isolates a first volume, which is facing the first side of the measuring membrane, from a second volume, which is facing the second side of the measuring membrane. The pressure measuring cell further includes a transducer for transducing pressure-dependent deflection of the measuring membrane into an electrical or optical signal.

BACKGROUND DISCUSSION

Pressure measurement cells of the field of the invention are disclosed, for example, in published international application, WO 2011/006741 A1, European patent, EP 0 373 536 A2 and published international application, WO 2011/003730 A1 as well as in documents mentioned therein. An overview of electrical transducer principles and a description of the deformation of measuring membranes and the resulting mechanical stresses is explained by Pfeifer and Werthschützky in "Drucksensoren (Pressure Sensors)", Berlin, 1989. It should be noted that the nomenclature in the mentioned publications is not uniform. The measuring membranes according to WO 2011/006741 A1, WO2011/003730 A1, respectively the present invention, are plates, especially circular plates in the sense of Pfeifer and Werthschuetzky, respectively EP 0 373 536 A2.

A problem with measuring membranes is their limited overload resistance. On the one hand, the measuring membranes should be sufficiently thin, in order in the desired measuring range to be deflectable with a usable amplitude, and, on the other hand, they should withstand an overload pressure, which can be a multiple of the measuring range.

In order, nevertheless, to be able to apply sufficiently sensitive measuring membranes, approaches for overload protection of the measuring membrane are known that involve support in the case of overload, for example, support by membrane beds. In such case, the measuring membrane should in the case of exceeding a limit value for the positive pressure be at least sufficiently supported on the membrane bed that the bursting stress of the measuring membrane is not reached even in the case of an additional pressure rise. For such purpose, especially aspherical membrane beds are suitable, which approximate the bend line of the measuring membrane at the limit value for the positive pressure. Corresponding membrane beds are disclosed in U.S. Pat. No. 4,458,537, German patent, DE 10 2009 046 229 A1, U.S. Pat. No. 7,360,431 B2, German patent, DE 10 2010 028 773 A1, Japanese patent, JP10078366A and U.S. Pat. No. 5,381,299. European patent, EP 0 373 536 A2 discloses a pressure sensor, which provides a support ring for annular support of the measuring membrane in the case of an overload.

German patent, DE 10 2010 028 504 A1 discloses a pressure sensor with a platform having a planar surface and a measuring membrane having in the resting position a concave surface, which faces the platform. When the measuring membrane is deflected by pressure loading from the side facing away from the platform toward the platform, the concave surface of the resting position assumes exactly at the degree of deflection a planar shape, in the case of which the measuring membrane contacts the platform. In this way, a full surface support of the measuring membrane is achieved, and a further rise of mechanical stresses in the measuring membrane is reliably prevented. A similar approach is described in European patent, EP 0439 494 B1. The measuring membrane additionally includes, compared with the concave region, a thinner, ring-shaped, edge region, which surrounds the concave region. Therewith, the membrane is more easily deflectable, and the maximum stresses in the edge region in the case of a given deflection of the measuring membrane are smaller than would be the case with an uninterrupted continuing of the concave contour up to the outer edge of the measuring membrane.

SUMMARY OF THE INVENTION

Although all the above-described approaches fulfill their purpose to a certain degree, the structures are more complex and therewith associated with increased manufacturing costs. It is, consequently, an object of the present invention to provide a simple, overload resistant, pressure measuring cell.

This object is achieved according to the invention by a pressure measuring cell which is characterized by features including that the measuring membrane has in the equilibrium state of the measuring membrane compressive stresses at least at the surface of the measuring membrane at least in a radial edge region, in which in the deflected state of the measuring membrane under pressure loading tensile stress maxima occur.

The terminology, equilibrium state, describes a state of the measuring membrane, in which the same pressure is present on both sides of the measuring membrane.

In a further development of the invention, the radial region, in which the measuring membrane has compressive stresses, extends from a minimum radius $r_{min}$ at least out to the outer radius o of the deflectable region.

In a further development of the invention, the ratio between the minimum radius and the outer radius of the deflectable region $r_{min}/r_o$ amounts to not less than 0.6, especially not less than 0.7.

In a further development of the invention, the ratio between the minimum radius and the outer radius of the deflectable region $r_{min}/r_o$ amounts to no more than 0.9, especially no more than 0.85.

In a further development of the invention, the radial region, in which the measuring membrane has compressive stresses, extends beyond the outer radius r of the deflectable region out to a maximum radius $r_{max}$, in the case of which $r_{max}/r_o \geq 1.05$, especially $\geq 1.1$.

In a further development of the invention, the compressive stresses have a maximum value of not less than 50 MPa, especially not less than 80 MPa and preferably not less than 100 MPa.

In a further development of the invention, the measuring membrane has in an annular volume, which extends between the minimum radius $r_{min}$ and the maximum radius $r_{max}$, wherein $(r_{max}-r_{min})/r_o \geq 0.1$, wherein the annular volume has from a surface of the measuring membrane a depth of, for example, not more than 20 μm, especially not more than 12 μm and, for example, not less than 5 μm, especially not less than 8 μm, an average compressive stress, which amounts to not less than 20 MPa, especially not less than 40 MPa and preferably not less than 80 Mpa. The depth can be, for example, about 5% to 10% of the thickness h of the measuring membrane.

BRIEF DESCRIPTION OF THE DRAWINGS

The invention will now be explained in greater detail based on examples of embodiments illustrated in the drawing, the figures of which show as follows:

FIG. 1a: is a schematic diagram of a clamped membrane;

FIG. 1b: is a longitudinal section through a pressure measuring cell according to the state of the art;

FIG. 1c: is a graph of the radial and tangential stresses of a measuring membrane of a pressure measuring cell according to the state of the art;

FIG. 3a: is a longitudinal section through a second example of an embodiment of a pressure measuring cell of the invention;

FIG. 3b: is a longitudinal section through a third example of an embodiment of a pressure measuring cell of the invention; and FIG. 3c: is a longitudinal section through a fourth example of an embodiment of a pressure measuring cell of the invention.

DETAILED DISCUSSION IN CONJUNCTION WITH THE DRAWINGS

The arrangement of FIG. 1a shows a clamped measuring membrane with a radius o and a material thickness h, for which according to di Giovanni: "Flat and Corrugated Diaphragm Design Handbook" the curves shown in FIG. 1c hold for the radial and tangential stresses.

The pressure measuring cell 10 of the state of the art, as shown in FIG. 1b, includes a ceramic measuring membrane 11 and a ceramic platform 12, which are connected pressure-tightly with one another along an annular, peripheral joint 13 of active hard solder, or braze, or glass. Due to the stiffness of the joint 13, the deflectable part of the measuring membrane 11, which is not supported by the joint, behaves essentially like the clamped membrane of FIG. 1a, so that the stress curve shown in FIG. 1c holds correspondingly also for the membrane 11 of the pressure measuring cell 10 of FIG. 1b. In accordance therewith, the greatest radial stresses occur at the edge (r/o=1). For example, in the case of a measuring membrane with h=250 µm and o=12 mm at a pressure of p=0.4 Mpa, radial tensile stresses of around 700 MPa can occur at the edge. These tensile stresses lie above the current values of fracture stress $\sigma_{0.1}$ of corundum. In the state of the art, this membrane would thus not be suitable for a measuring range of 0.4 MPa (4 bar). By supporting the center of the membrane on the platform, the radial tensile stresses in the edge region of the membrane can be reduced. For example, by means of a joint, which has a thickness of, for instance, 35 µm, a separation d of corresponding size can be predetermined between membrane and platform, so that the measuring membrane in the case of overload bears on the platform. The result is that the radial tensile stresses in the edge region are limited to less than 350 MPa, but even in this situation, values of the fracture stress $\sigma_{0.1}$ of current corundum materials can be achieved. The pressure measuring cell of the invention offers an approach for reducing the tensile stresses sufficiently that the fracture stress $\sigma_{0.1}$ is not reached.

Figure 2A:
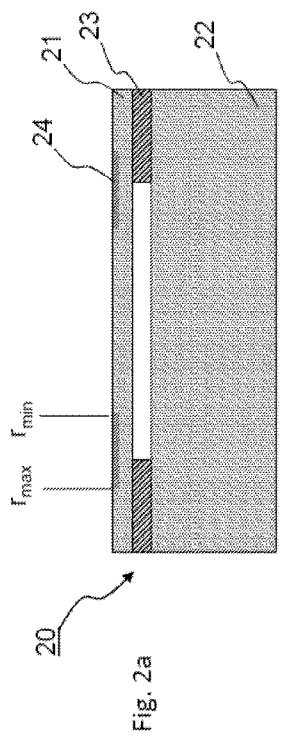
FIG. 2a: is a longitudinal section through an example of an embodiment of a pressure measuring cell of the invention.

The pressure measuring cell 20 of the invention shown in FIG. 2a overcomes this limitation in the following way: It includes, as before, a ceramic measuring membrane 21 and a ceramic platform 12, which are pressure-tightly connected with one another along an annular, peripheral joint 23 of an active hard solder, or braze, or glass. Structurally, there are thus no obvious differences. However, the measuring membrane 21 includes on its surface facing away from the platform an annular region 24, which contains compressive stresses in the equilibrium state of the measuring membrane. This is the region stressed the most under pressure loading, so that is where in the normal case the greatest tensile stresses occur. The compressive stresses present in the resting position bring about, in contrast, a shifting of the stress zero point for the region, so that only in the case of a certain strain of the region due to a pressure loading does a radial tensile stress different from zero occur. Accordingly, the resulting tensile stresses are reduced in the case of an additional deflection of the measuring membrane 21 in the vicinity of the surface region 24, so that the arising maximum tensile stresses are reduced compared with the pressure measuring cell according to the state of the art. In this way, the pressure measuring cell can in the case of otherwise equal construction be operated over a pressure range, without the arising tensile stresses lying above the current values of the breaking stress $\sigma_{0.1}$ of corundum.

Figure 2B:
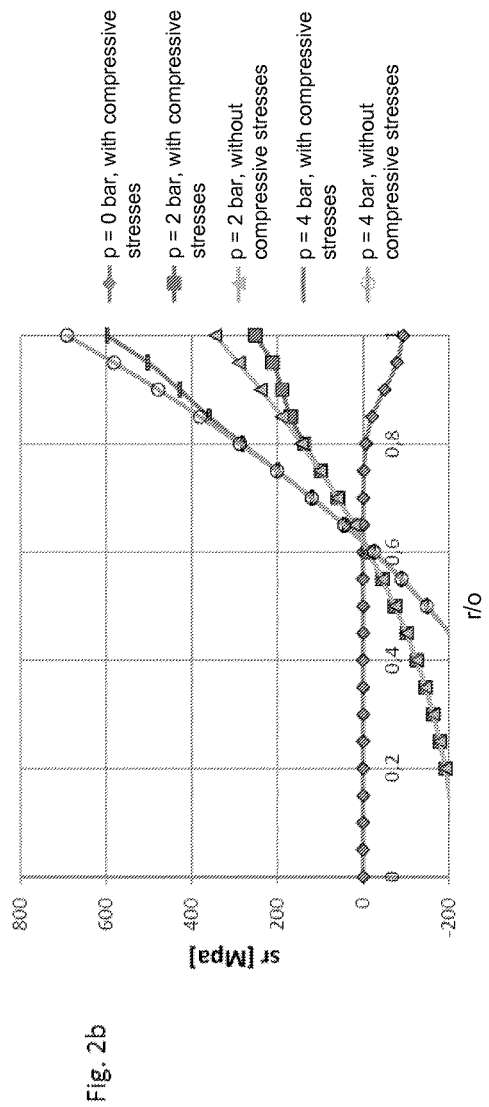
FIG. 2b: is a graph of the radial stress of a measuring membrane of a pressure measuring cell of the invention.

The effect is illustrated in FIG. 2b, wherein for pressure values of 2 bar and 4 bar, in each case, the radial stresses of a measuring membrane with and without provided compressive stresses are shown. The curves are not the result of measurements or a numerical simulation, but, instead, they describe qualitatively, the stress balance a providing of compressive stresses in the edge region of a measuring membrane can bring about.

Since the compressive stresses are only provided in a layer near to the surface, a thereby effected change of the equilibrium position of the measuring membrane is metrologically acceptable, i.e. there remains a sufficiently large, pressure-dependent stroke. Of course, however, this change must be taken into consideration in the case of a transfer function of a transducer of the pressure measuring cell.

The examples of embodiments shown in FIGS. 3a, 3b and 3c concern pressure measurement cells, in the case of which a zero point shifting due to the compressive stresses provided for minimizing the maximum tensile stresses is lessened, respectively prevented, by countermeasures. Basically, the description of the first example of an embodiment of FIG. 2a holds correspondingly for the examples of embodiments of the FIGS. 3a, 3b and 3c, wherein the reference numerals of the corresponding components are increased from one embodiment to the next by 100.

The pressure measuring cell 120 shown in FIG. 3a includes a measuring membrane 121, in the case of which an annular edge zone 124 on its surface facing away from the platform has compressive stresses, in order to lessen the tensile stresses arising in this region upon deflection of the measuring membrane. Furthermore, a central surface-near region 125 of the measuring membrane has compressive stresses, which counteract a zero point shifting due to the compressive stresses in the annular edge zone 124.

The pressure measuring cell 220 shown in FIG. 3b includes a measuring membrane 221, in the case of which a first annular edge zone 224 on its surface facing away from the platform has compressive stresses, in order to lessen the tensile stresses arising in this region upon a deflection of the measuring membrane. Furthermore, a second annular edge zone 225 on its surface facing the platform has compressive stresses, which counteract a zero point shifting due to the compressive stresses in the first annular edge zone 224.

The pressure measuring cell 320 shown in FIG. 3c includes a measuring membrane 321, in the case of which at least over the total deflectable region a first annular edge zone 324 on its surface facing away from the platform has compressive stresses at least over the total deflectable region, in order to lessen the tensile stresses arising in the edge region of the deflectable region in the case of a deflection of the measuring membrane, and in order to counteract a zero point shifting, such as can occur, in given cases, when compressive stresses are provided exclusively in the edge region of the surface facing away from the platform.

For fine-tuning the zero-point, the level of the compressive stresses can be varied in the different regions of the measuring membrane, when required.

For manufacturing the pressure measurement cells of the invention, ceramic, especially corundum, measuring membranes are, after firing, brought to their desired thickness and flattened, especially by grinding and/or lapping. This surface treatment causes compressive stresses in measuring membrane regions near to the surface. In the state of the art, these compressive stresses are completely eliminated by annealing the membranes before they are used.

According to the invention, localized thermal treatment is used, for example with laser pulses, whereby the compressive stresses are only eliminated in selected places, so that compressive stresses remain where they are desired.

The invention claimed is:

1. A method for preparing a measuring membrane for a pressure measuring cell, comprising:

providing a membrane blank of a ceramic material;

introducing compressive stresses into the membrane blank by surface treatment, said surface treatment includes grinding and/or lapping; and lessening said compressive stresses in at least a first radial region of the measuring membrane, wherein:

said compressive stresses in at least a second radial region of the measuring membrane, respectively are lessened less strongly; and said lessening of the compressive stresses occurs by means of local treatment by means of laser radiation.

2. The method as defined in claim 1, wherein:

the measuring membrane includes: an elastic measuring membrane, which is connectable with a first pressure on a first side and with a second pressure on a second side facing away from said first side, said measuring membrane is deflectable as a function of a difference between said first pressure and said second pressure; and a transducer for transducing the pressure-dependent deflection of said measuring membrane into an electrical or optical signal, wherein:

said measuring membrane pressure tightly isolates a first volume, which faces said first side of said measuring membrane from a second volume, which faces said second side of said measuring membrane; and said measuring membrane has in an equilibrium state of said measuring membrane compressive stresses at least at the surface of said measuring membrane, at least in said second radial region, said second radial region being a radial edge region, in which in the deflected state of said measuring membrane, under pressure loading tensile stress maxima occur.

\* \* \* \* \*